US012607990B2

(12) United States Patent
Chiu et al.

(10) Patent No.: US 12,607,990 B2
(45) Date of Patent: Apr. 21, 2026

(54) SCHEDULING SYSTEM AND METHOD USING A KNOWLEDGE GRAPH

(71) Applicant: INDUSTRIAL TECHNOLOGY RESEARCH INSTITUTE, Hsinchu (TW)

(72) Inventors: Chung-Jen Chiu, Hsinchu City (TW); Meng-Sung Wu, Hsinchu County (TW); Tsan-Cheng Su, Tainan City (TW); I-Hsiu Lee, Zhubei City (TW); Chung-Wei Lin, Zhubei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 778 days.

(21) Appl. No.: 17/743,333

(22) Filed: May 12, 2022

(65) Prior Publication Data

US 2023/0195089 A1     Jun. 22, 2023

(30) Foreign Application Priority Data

Dec. 22, 2021     (TW) ................................. 110148189

(51) Int. Cl.
*G05B 19/418* (2006.01)
*G06N 5/04* (2023.01)
*G06Q 10/0631* (2023.01)

(52) U.S. Cl.
CPC . *G05B 19/41865* (2013.01); *G05B 19/41885* (2013.01); *G06N 5/04* (2013.01); *G06Q 10/0631* (2013.01)

(58) Field of Classification Search
CPC ........ G05B 19/41865; G05B 19/41885; G06N 5/04; G06Q 10/0631
See application file for complete search history.

(56) References Cited

U.S. PATENT DOCUMENTS

| | | | |
|---|---|---|---|
| 7,043,414 B2 * | 5/2006 | Brown ................... | G06Q 50/04 |
| | | | 700/95 |
| 10,031,517 B2 * | 7/2018 | Li .................... | G05B 19/41865 |

(Continued)

FOREIGN PATENT DOCUMENTS

| | | |
|---|---|---|
| AU | 2020102079 | 10/2020 |
| CN | 111191821 | 5/2020 |

(Continued)

OTHER PUBLICATIONS

Taiwan Office Action dated Dec. 29, 2022 as received in application No. 110148189.

(Continued)

*Primary Examiner* — Dylan C White
(74) *Attorney, Agent, or Firm* — Maschoff Brennan

(57) ABSTRACT

A scheduling method using a knowledge graph (KG) performs following steps by a processor: obtaining an initial scheduling solution of the production system; converting the initial scheduling solution into triples to form the KG, each triples includes two entities and a relationship of the production system, the two entities indicate two production resources; embedding triples into a vector space to generate embedded vectors by a KG embedding technique; generating embedded vector combinations according to the embedded vectors and computing a distance of each of embedded vector combinations; and performing a scheduling algorithm to generate a target scheduling solution according to the embedded vector combinations, and providing reference information when the scheduling algorithm generates a schedule of a station, wherein the reference information comprises at least one of the embedded vector combinations associated with the station, and the distance corresponding to said at least one embedded vector combinations.

12 Claims, 2 Drawing Sheets

(56) References Cited

U.S. PATENT DOCUMENTS

| 10,824,675 | B2 | 11/2020 | Alonso et al. |
| 2017/0091688 | A1 * | 3/2017 | Lopes ................ G06Q 10/0635 |
| 2019/0362246 | A1 | 11/2019 | Lin et al. |
| 2020/0133962 | A1 | 4/2020 | Kuo |
| 2020/0349508 | A1 | 11/2020 | Albrecht |
| 2020/0364619 | A1 | 11/2020 | Kazemi et al. |
| 2021/0056510 | A1 | 2/2021 | Raghavan et al. |
| 2022/0080634 | A1 * | 3/2022 | Rella ................ G06Q 10/06312 |
| 2023/0221706 | A1 * | 7/2023 | Nakano .................. G06Q 10/06 |
| | | | 700/97 |

FOREIGN PATENT DOCUMENTS

| CN | 111563173 | | 8/2020 | |
| CN | 111582561 | | 8/2020 | |
| CN | 112434171 | A | 3/2021 | |
| CN | 112712177 | A | 4/2021 | |
| EP | 3859619 | A1 * | 8/2021 | |
| TW | 202016758 | A | 5/2020 | |
| WO | WO-2024213926 | A1 * | 10/2024 | ............. G06F 16/36 |

OTHER PUBLICATIONS

Zhou et al. "A novel knowledge graph-based optimization approach for resource allocation in discrete manufacturing workshops" Mar. 2021.

* cited by examiner

SCHEDULING SYSTEM AND METHOD USING A KNOWLEDGE GRAPH

CROSS-REFERENCE TO RELATED APPLICATIONS

This non-provisional application claims priority under 35 U.S.C. § 119(a) on Patent Application No(s). 110148189 filed in Taiwan, ROC on Dec. 22, 2021, the entire contents of which are hereby incorporated by reference.

TECHNICAL FIELD

The present disclosure relates to a scheduling system and method using a knowledge graph (KG).

BACKGROUND

For factory scheduling on the production line, the traditional method usually relies on experience or statistics processed manually, in order to develop a set of suitable scheduling. However, this method greatly depends on the experience of the operators themselves, with a large number of machines and complex processes, it is not easy to find the correlation between machines, materials and products. Therefore, it is difficult to obtain the scheduling solution of best production combination.

For example, machines on a production line can be divided into frequently-used machines and non-frequently-used machines, and non-frequently-used machines are usually ignored when the scheduling relies on experience. However, the use of non-frequently-used machines is not necessarily to reduce production efficiency, but may discover new highly productive scheduling thereof.

SUMMARY

According to an embodiment of the present disclosure, a scheduling method using a knowledge graph, which is applicable to a production system, wherein the production system comprises a plurality of machines performing production operations of a plurality of products, and the method comprises performing following steps by a processor: obtaining an initial scheduling solution of the production system; converting the initial scheduling solution into a plurality of triples to form the knowledge graph, wherein each of the plurality of triples includes two entities and a relationship of the production system, the two entities indicate two production resources, the relationship is associated with another production resource of the production system performing the initial scheduling solution; embedding the plurality of triples of the knowledge graph into a vector space to generate a plurality of embedded vectors of the plurality of production resources by a knowledge graph embedding technique; generating a plurality of embedded vector combinations of production resources according to the plurality of embedded vectors of production resources and computing a distance of each of the plurality of embedded vector combinations; and performing a scheduling algorithm to generate a target scheduling solution according to the plurality of embedded vector combinations, and providing reference information when the scheduling algorithm generates a schedule of a station, wherein the station is associated with at least one of the plurality of machines, and the reference information comprises at least one of the plurality of embedded vector combinations associated with the station, and the distance corresponding to said at least one embedded vector combinations.

According to an embodiment of the present disclosure, a scheduling system using a knowledge graph, which is applicable to a plurality of products, with each of the plurality of products having a product part number and the scheduling system comprising: an input interface configured to receive an initial scheduling solution; a production system configured to perform the initial scheduling solution, wherein the production system comprises a plurality of stations, each of the plurality of stations comprises at least one machines, each of said at least one machines has a machine number, and said at least one machine performs production operations on the plurality of products; a communication device communicably connecting to the plurality of stations to receive a production resource of the production system performing the initial scheduling solution; a processor communicably connecting to the input interface and the communication device, wherein the processor is configured to perform a plurality of instructions to generate a target scheduling solution, and the plurality of instructions comprises: obtaining the initial scheduling solution from the input interface; converting the initial scheduling solution into a plurality of triples to form the knowledge graph, wherein each of the plurality of triples includes two entities, the two entities indicate two production resources and a relationship of the production system, the relationship is associated with another production resource of the production system performing the initial scheduling solution; embedding the plurality of triples of the knowledge graph into a vector space to generate an embedded vector of the plurality of production resources by a knowledge graph embedding technique; generating a plurality of embedded vector combinations of production resources according to the plurality of embedded vectors of production resources and computing a distance of each of the plurality of embedded vector combinations; and performing a scheduling algorithm to generate a target scheduling solution according to the plurality of embedded vector combinations, and providing reference information when the scheduling algorithm generates a schedule of a station, wherein the station is associated with at least one of the plurality of machines, and the reference information comprises at least one of the plurality of embedded vector combinations associated with the station, and the distance corresponding to the above at least one embedded vector combination.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
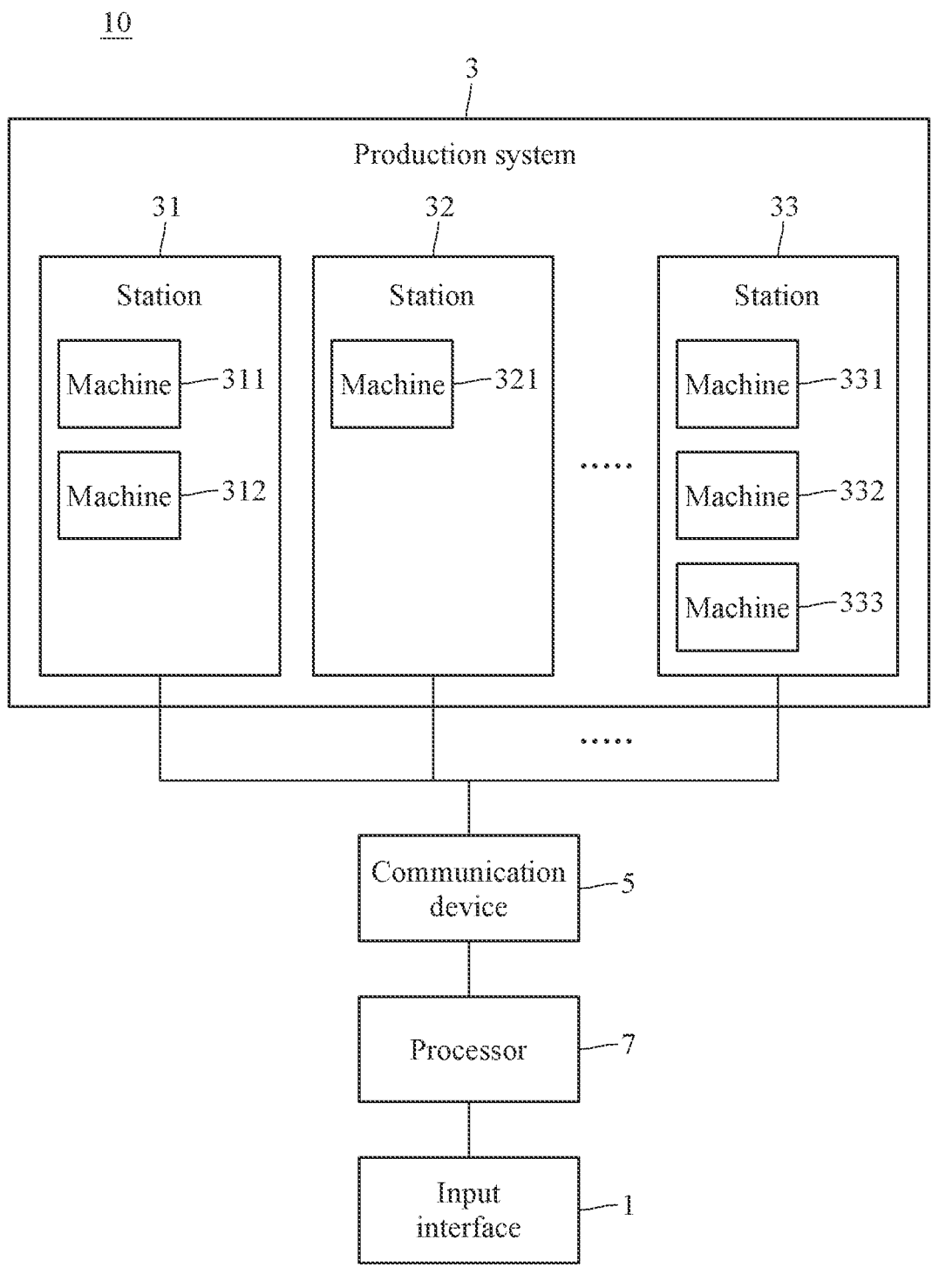
FIG. 1 is an architecture diagram of a scheduling system using a knowledge graph according to an embodiment of the present disclosure.

FIG. 1 is an architecture diagram of a scheduling system using a knowledge graph (KG) according to an embodiment of the present disclosure. The scheduling system is applicable to a plurality of products, and every product has a product part number. As shown in FIG. 1, the scheduling system 10 includes an input interface 1, a production system 3, a communication device 5 and a processor 7.

The input interface 1 is configured to receive an initial scheduling solution. In an embodiment, the input interface 1 may be, for example, a keyboard, a mouse, or a touch panel. However, the present disclosure is not limited thereto.

The production system 3 is configured to perform the initial scheduling solution. The production system 3 tion on the product P, or the name of the jig that the machine 311 adopts on product P.

The processor 7 is communicably connected to the input interface 1 and the communication device 5. The processor 7 is configured to perform a plurality of instructions to generate a target scheduling solution applicable to the production system 3. Please refer to FIG. 2 for these instructions.

Figure 2:
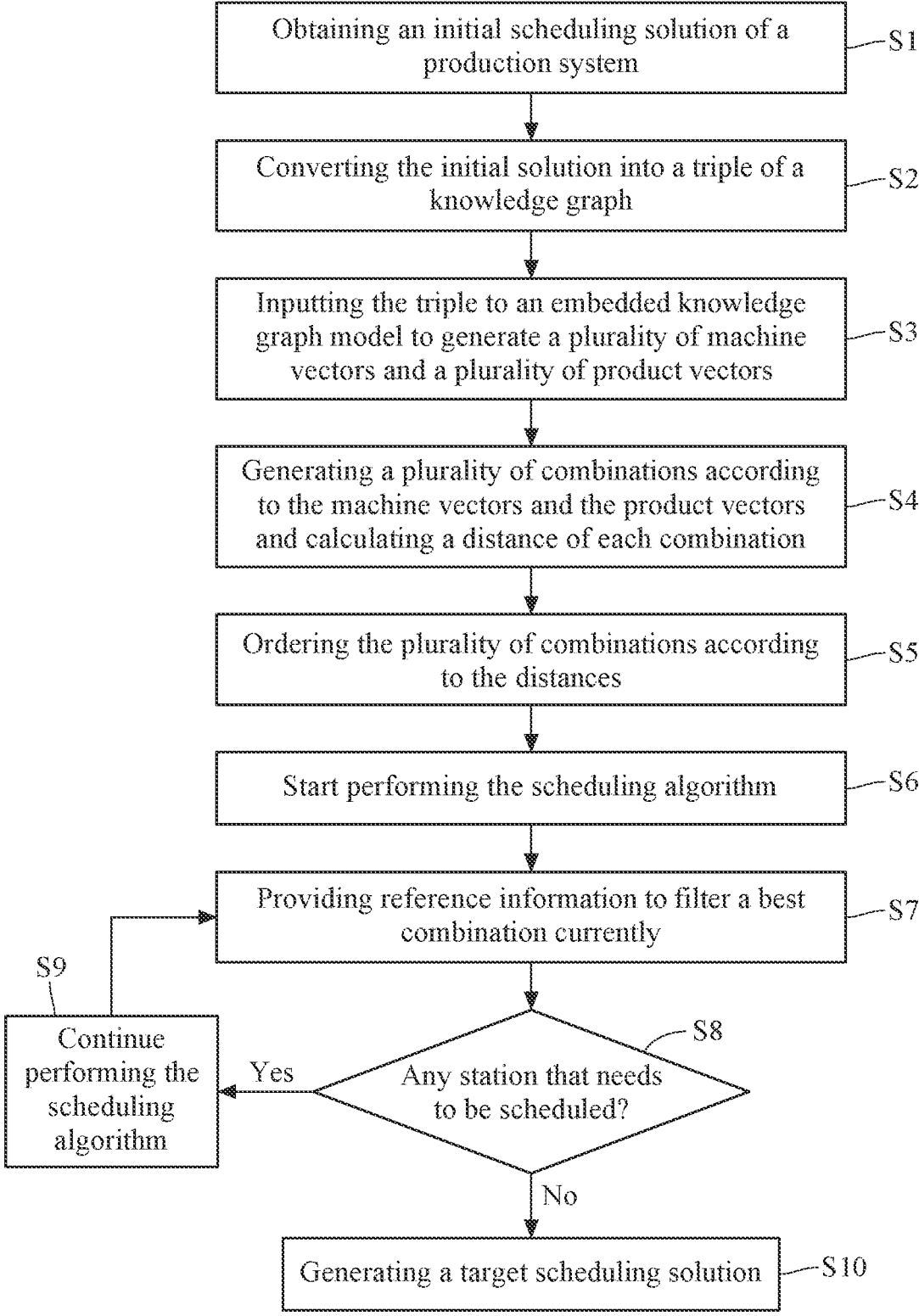
FIG. 2 is a flow chart of a scheduling method using a knowledge graph according to an embodiment of the present disclosure.

FIG. 2 is a flow chart of a scheduling method using a knowledge graph according to an embodiment of the present disclosure.

In step S1, the processor 7 obtains the initial scheduling solution from the input interface 1. The data structure of the initial scheduling solution includes a plurality of rows, each of the plurality of rows records at least one of a process number, a machine number, a product part number, a station name, a version, a machine name, a start time and an end time. Table 1 shows an example of the initial scheduling solution.

TABLE 1 an example of initial scheduling solution.

| Process number | Machine number | Product part number | Station name | Version | Machine name | Start time | End time | . . . |
|---|---|---|---|---|---|---|---|---|
| 10 | M1 | TITRI1 | OPE01 | A1 | M1 | 2021 Jul. 14 20:27 | 2021 Jul. 14 20:40 | . . . |
| 12 | M2 | TITRI2 | OPE02 | A7 | M2 | 2021 Jul. 14 20:27 | 2021 Jul. 14 21:05 | . . . |
| 10 | M3 | TITRI3 | OPE01 | A4 | M3 | 2021 Jul. 14 20:27 | 2021 Jul. 14 20:40 | . . . |
| . . . | . . . | . . . | . . . | . . . | . . . | . . . | . . . | . . . | includes a plurality of stations 31, 32 and 33, and the present disclosure does not limit the upper limit of the number of the stations. Each station 31, 32, or 33 includes at least one machine. For example, the station 31 includes the machine 311 and 312, the station 32 includes machine 321, and the station 33 comprise machines 331, 332, 333, and the present disclosure does not limit the number of machines of each station. Each machine 311, 312, 321, 331, 332, or 333 has a machine number, and the plurality of machines 311-333 perform production operations on a plurality of products. For example, the machine 311 performs a first production operation on the product P to generate a product Q, and the machine 321 performs a second production operation on the product Q to generate a product R. The so-called "scheduling" refers to the process of assigning the product P to the machine 311 to be processed by the first production operation firstly and then to the machine 321 to be processed by the second production operation. In a plurality of available scheduling solutions, the scheduling that improves at least one of an order fill rate, a setup time rate, a machine run rate, and a measurable index associated with the production progress is called scheduling solution herein, wherein the setup time rate represents a ratio of a time for machine setup to a time of machine activation during the operating time of the machine.

The communication device 5 is communicably connected to the stations 31, 32 and 33 to receive a production resource (or parameters thereof) of the production system 3 performing the initial scheduling solution. The initial scheduling solution may be a scheduling solution generated by the rule of thumb or statistical data. The production resource (or parameters thereof) may be, for example, the number of times the machine 311 performs the first production opera- In step S2, the processor 7 converts the initial scheduling solution into a plurality of triples of a KG, wherein each of the plurality of triples includes two entities and a relationship of the production system, and the two entities indicate two production resources. In an example, the two production resources are a product part number and a machine number. The relationship is associated with the production resource (or parameter thereof). In an embodiment, a type of the relationship includes a product usage count, and a jig name used by the plurality of products. Table 2-1, Table 2-2, and Table 2-3 are examples of triples.

TABLE 2-1 the first example of the triples.

| Product part number | Relationship | Machine number |
|---|---|---|
| TIRTI1 | 2 | M1 |
| TIRTI2 | 3 | M3 |
| TIRTI4 | 6 | M1 |
| . . . | . . . | . . . |

TABLE 2-2 the second example of the triples

| Machine number | Relationship | Jig |
|---|---|---|
| M2 | 2 | P5 |
| M1 | 4 | P23 |
| . . . | . . . | . . . |

TABLE 2-3

| the third example of the triples | | |
| --- | --- | --- |
| Product part number | Relationship | Recipe |
| TIRTI1 | On M2 | Re2 |
| TIRTI3 | On M5 | Re1 |
| . . . | . . . | . . . |

In step S3, the processor 7 inputs each triple to a KG embedding model to generate a plurality of embedded vectors of production resources such as a plurality of embedded vectors representing machines and products. The plurality of embedded vectors includes a plurality of machine embedded vectors and a plurality of product embedded vectors. In an embodiment, the KG embedding model is TransH. However, the present disclosure is not limit thereto. Table 3 shows an example of machine embedded vectors and Table 4 shows an example of product embedded vectors.

TABLE 3

| an example of machine embedded vectors. | | | | |
| --- | --- | --- | --- | --- |
| Machine number | Dimension 1 | Dimension 2 | . . . | Dimension N |
| M1 | −0.04772 | −0.01858 | . . . | 0.142729 |
| M2 | −0.01643 | 0.121026 | . . . | −0.2189 |
| M3 | 0.052675 | 0.24272 | . . . | −0.2173 |
| . . . | . . . | . . . | . . . | . . . |

TABLE 4

| an example of product embedded vectors. | | | | |
| --- | --- | --- | --- | --- |
| Product part number | Dimension 1 | Dimension 2 | . . . | Dimension N |
| TITRI1 | −0.08317 | −0.07252 | . . . | −0.0999 |
| TITRI2 | −0.02011 | −0.07616 | . . . | 0.217341 |
| TITRI3 | −0.07892 | −0.13958 | . . . | −0.21222 |
| . . . | . . . | . . . | . . . | . . . |

In step S4, the processor 7 generates a plurality of embedded vector combinations according to the plurality of machine embedded vectors and the plurality of product embedded vectors, and computes a distance of each of the plurality of embedded vector combinations. In step S5, the processor 7 orders the plurality of combinations according to the distance. The plurality of embedded vector combinations and their corresponding distances are shown as Table 5. In an embodiment, the distance computing method may be, for example, computing a Euclidean Distance between a machine embedded vector and a product embedded vector. However, the present disclosure is not limited thereto.

TABLE 5

| an example of "machine-product" combinations | | |
| --- | --- | --- |
| Product part number | Machine number | Distance |
| TIRTI1 | M1 | 1.3071 |
| TITRI3 | M5 | 1.5399 |
| TITRI3 | M6 | 1.5921 |
| TITRI3 | M2 | 1.6715 |
| TITRI3 | M3 | 1.7529 |
| TITRI3 | M2 | 1.3191 |

TABLE 5-continued

| an example of "machine-product" combinations | | |
| --- | --- | --- |
| Product part number | Machine number | Distance |
| TITRI5 | M3 | 1.4013 |
| TITRI5 | M5 | 1.6973 |
| TITRI5 | M5 | 1.3754 |
| . . . | . . . | . . . |

In step S6, the processor 7 starts performing a scheduling algorithm. For example, one station is selected to perform the scheduling algorithm every time, and the present disclosure does not limit the selection order or the selection method. In an embodiment, the scheduling algorithm is deep reinforcement learning (DRL) or Monto Carlo tree search (MCTS). However, the present disclosure is not limited thereto. In an embodiment, the scheduling algorithm is configured to improve at least one of the order fill rate, setup time rate and machine run rate.

In an embodiment, the scheduling algorithm includes: selecting the station from a plurality of scheduling candidate stations; selecting a best combination from the plurality of embedded vector combinations according to a current time and the reference information; determining whether the number of the plurality of scheduling candidate stations is smaller than a threshold; outputting the scheduling solution when the number of the plurality of scheduling candidate stations is smaller than the threshold; and selecting another best combination from the plurality of embedded vector combinations according to another current time and the reference information when the plurality of scheduling candidate stations is not smaller than the threshold. Please refer to steps S7-S10 below.

In step S7, the processor 7 provides reference information to select the best combination currently. For example, when the scheduling algorithm generates a scheduling of the station 31, the processor 7 provides reference information. The reference information includes at least one embedded vector combination, associated with the station 31, of a plurality of embedded vector combinations and the distance corresponding to said at least one combination. For example, a plurality of rows can be selected from table recording combinations of "machine-product" (see Table 5) according to machines 311, 312 corresponding to the station 31. Each row includes a product part number, a machine number and a rank corresponding to a distance between the above two numbers. The smaller the distance, the smaller the rank. The smaller the rank, the easier the row selected by the scheduling algorithm. Table 6 is an example of a production combination of a station.

TABLE 6

| an example of a production combination of a station. | | |
| --- | --- | --- |
| Product part number | Machine number | Rank |
| TITRI3 | M6 | 3 |
| TITRI3 | M5 | 2 |
| TITRI3 | M1 | 1 |
| TITRI5 | M2 | 3 |
| TITRI5 | M3 | 2 |
| TITRI5 | M5 | 1 |
| TITRI2 | M5 | 1 |
| . . . | . . . | . . . |

For example, when the processor performs the scheduling algorithm, the processor 7 performs a preliminary selection to Table 6 according to the number(s) of available machine or product currently, and then selects production combination of small rank among the selected rows, such as "product part number TITRI3, machine name M1, rank 1" as a scheduling of the station. However, the present disclosure is not limited to the above example. In the scheduling of a station, it is possible that more than one production combination is selected by the processor.

In step S8, the processor 7 determines whether there is still a station that needs scheduling. If the determination result is "yes", the next step will be step S9. In step S9, the processor 7 continues performing the scheduling algorithm according to the station that has not been scheduled, including performing the process described in step S7. On the other hand, if the determination result is "no", the next step will be step S10. In step S10, the processor 7 generates a target scheduling solution. The target scheduling solution may be served as the initial scheduling solution used in step S1 of the scheduling method performed next time according to an embodiment of the present disclosure. By repeatedly performing the scheduling method according to an embodiment of the present disclosure to update the target scheduling solution, the current scheduling mechanism may be continuously optimized, and the machine utilization rate and the yield of product may be improved efficiently. Table 7 shows a yield comparison between the present disclosure and the conventional scheduling method, wherein the "capacity planning" represents the number of products expected to be put into production, and the number of products passing through the bottleneck station represents the number of products that pass through the bottleneck station in the production process of a product.

TABLE 7

| comparison table of product. | | | |
| --- | --- | --- | --- |
| | Manual scheduling | DRL scheduling | Present disclosure |
| capacity planning per month | 108910 | 111490 (+2.37%) | 108910 (+3.47%, +1.07%) |
| number of products passing through the bottleneck station | 779964 | 799002 (+2.44%) | 819508 (+5.07%, +2.57%) |

It can be seen from Table 7 that applying scheduling method using a knowledge graph according to an embodiment of the present disclosure may improve monthly capacity planning by 3.47% compared to applying manual scheduling, improve monthly capacity planning by 1.07% compared to applying scheduling method using deep reinforcement learning only. In addition, applying scheduling method using a knowledge graph according to an embodiment of the present disclosure may improve the number of products passing through the bottleneck station by 5.07% compared to applying manual scheduling, improve the number of products passing through the bottleneck station by 2.57% compared to applying scheduling method using deep reinforcement learning only. According to the numbers in Table 7, applying the present disclosure to schedule the scheduling solution of the best production combination may reduce the waiting time for production.

In view of the above, the present disclosure combines the knowledge graph and the deep reinforcement learning to generate a scheduling solution of the best production combination. The present disclosure establishes a complex knowledge graph of scheduled dispatching, which may be used to calculate a best production combination of products and machines. The present disclosure generates a new scheduling solution through the scheduling algorithm based on the best production combination to further update the knowledge graph so that improves the span of knowledge graph. The present disclosure converts the knowledge graph into the embedded vectors through the technique of knowledge graph embedding (KGE), digs available "machine-product" production combinations therefrom, and jumps out of the previous method that selects machines based on rules of thumb or statistical data. The present disclosure inputs the "machine-product" production combination into the DRL scheduling algorithm to generate a better scheduling solution. The present disclosure may be applied to, for example, the production line in panel factory, and has utility/industrial applicability. The present disclosure may improve the machine's average utilization rate, reduce the machine loss. Compared to the manual scheduling, the present disclosure may efficiently improve the production capacity and daily yield.

What is claimed is:

1. A scheduling method using a knowledge graph, which is applicable to a production system, wherein the production system comprises a plurality of machines performing production operations of a plurality of products, and the method comprises performing following steps by a processor:

obtaining an initial scheduling solution of the production system, wherein a data structure of the initial scheduling solution comprises a plurality of rows, each of the plurality of rows records at least one of a process number, a machine number, a product part number, a station name, a version, a machine name, a start time and an end time;

converting the initial scheduling solution into a plurality of triples to form the knowledge graph, wherein each of the plurality of triples includes two entities and a relationship of the production system, the two entities indicate two production resources, the relationship is associated with another production resource of the production system performing the initial scheduling solution;

embedding the plurality of triples of the knowledge graph into a vector space to generate a plurality of embedded vectors of the plurality of production resources by a knowledge graph embedding technique;

generating a plurality of embedded vector combinations of production resources according to the plurality of embedded vectors of production resources and computing a distance of each of the plurality of embedded vector combinations; and performing a scheduling algorithm to generate a target scheduling solution according to the plurality of embedded vector combinations, and providing reference information when the scheduling algorithm generates a schedule of a station, wherein the station is associated with at least one of the plurality of machines, and the reference information comprises at least one of the plurality of embedded vector combinations associated with the station, and the distance corresponding to the at least one embedded vector combinations;

wherein the scheduling algorithm comprise:

selecting the station from a plurality of scheduling candidate stations, wherein the station is one of the plurality of scheduling candidate stations;

selecting a best combination from the plurality of embedded vector combinations according to a current time and the reference information; and determining whether a number of the plurality of scheduling candidate stations is smaller than a threshold, wherein:

outputting the scheduling solution when the number of the plurality of scheduling candidate stations is smaller than the threshold; and selecting another best combination from the plurality of embedded vector combinations according to another current time and the reference information when the plurality of scheduling candidate stations is not smaller than the threshold.

2. The scheduling method using the knowledge graph of claim 1, wherein the two production resources are a product part number and a machine number.

3. The scheduling method using the knowledge graph of claim 1, wherein a type of the relationship comprises at least one of a product usage count, a jig name used by the plurality of products.

4. The scheduling method using the knowledge graph of claim 1, wherein the knowledge graph embedding technique uses a TransH model.

5. The scheduling method using the knowledge graph of claim 1, wherein the scheduling algorithm is deep reinforcement learning or Monto Carlo tree search.

6. The scheduling method using the knowledge graph of claim 1, wherein the scheduling algorithm is used to increase at least one of following: order fill rate, setup time rate, machine run rate and a measurable index associated with a production process.

7. A scheduling system using a knowledge graph, which is applicable to a plurality of products, with each of the plurality of products having a product part number and the scheduling system comprising:

an input interface configured to receive an initial scheduling solution, wherein a data structure of the initial scheduling solution comprises a plurality of rows, each of the plurality of rows records at least one of a process number, a machine number, a product part number, a station name, a version, a machine name, a start time and an end time;

a production system configured to perform the initial scheduling solution, wherein the production system comprises a plurality of stations, each of the plurality of stations comprises at least one machines, each of said at least one machines has a machine number, and said at least one machine performs production operations on the plurality of products;

a communication device communicably connecting to the plurality of stations to receive a production resource of the production system performing the initial scheduling solution;

a processor communicably connecting to the input interface and the communication device, wherein the processor is configured to perform a plurality of instructions to generate a target scheduling solution, and the plurality of instructions comprises:

obtaining the initial scheduling solution from the input interface;

converting the initial scheduling solution into a plurality of triples to form the knowledge graph, wherein each of the plurality of triples includes two entities, the two entities indicate two production resources and a relationship of the production system, the relationship is associated with another production resource of the production system performing the initial scheduling solution;

embedding the plurality of triples of the knowledge graph into a vector space to generate an embedded vector of the plurality of production resources by a knowledge graph embedding technique;

generating a plurality of embedded vector combinations of production resources according to the plurality of embedded vectors of production resources and computing a distance of each of the plurality of embedded vector combinations; and performing a scheduling algorithm to generate a target scheduling solution according to the plurality of embedded vector combinations, and providing reference information when the scheduling algorithm generates a schedule of a station, wherein the station is associated with at least one of the plurality of machines, and the reference information comprises at least one of the plurality of embedded vector combinations associated with the station, and the distance corresponding to said at least one embedded vector combination;

wherein the scheduling algorithm comprise:

selecting the station from a plurality of scheduling candidate stations, wherein the station is one of the plurality of scheduling candidate stations;

selecting a best combination from the plurality of embedded vector combinations according to a current time and the reference information; and determining whether a number of the plurality of scheduling candidate stations is smaller than a threshold, wherein:

outputting the scheduling solution when the number of the plurality of scheduling candidate stations is smaller than the threshold; and selecting another best combination from the plurality of embedded vector combinations according to another current time and the reference information when the plurality of scheduling candidate stations is not smaller than the threshold.

8. The scheduling system using the knowledge graph of claim 7, wherein the two production resources are a product part number and a machine number.

9. The scheduling system using the knowledge graph of claim 7, wherein a type of the relationship comprises at least one of a product usage count, a jig name used by the plurality of products.

10. The scheduling system using the knowledge graph of claim 7, wherein the knowledge graph embedding technique uses a TransH model.

11. The scheduling system using the knowledge graph of claim 7, wherein the scheduling algorithm is deep reinforcement learning or Monto Carlo tree search.

12. The scheduling system using the knowledge graph of claim 7, wherein the scheduling algorithm is used to increase at least one of following: order fill rate, setup time rate, machine run rate and a measurable index associated with a production process.

* * * * *